G. W. HENRY.
TOOL HOLDER.
APPLICATION FILED JULY 20, 1918. RENEWED JUNE 11, 1919.

1,311,445. Patented July 29, 1919.

WITNESS:

George W. Henry
INVENTOR

BY Robert B Killgore
ATTORNEY

THE COLUMBIA PLANOGRAPH CO., WASHINGTON, D. C.

UNITED STATES PATENT OFFICE.

GEORGE W. HENRY, OF NEW YORK, N. Y., ASSIGNOR TO EDGAR BOISSIER, OF NEW YORK, N. Y.

TOOL-HOLDER.

1,311,445. Specification of Letters Patent. Patented July 29, 1919.

Application filed July 29, 1918, Serial No. 245,797. Renewed June 11, 1919. Serial No. 303,471.

*To all whom it may concern:*

Be it known that I, GEORGE W. HENRY, a citizen of the United States, residing at the borough of Queens, city of New York, in the county of Queens and State of New York, have invented certain new and useful Improvements in Tool-Holders, of which the following is a specification.

This invention relates to improvements in tool holders particularly to holders for the class of tools used in lathes, planers and the like.

The object of the present invention is to provide the tool holder disclosed in my co-pending application, Ser. No. 115,869 with improved means for holding a parting tool without employing loose pieces for this purpose and, at the same time, retain the simplicity of construction shown in said application.

Figure 1:
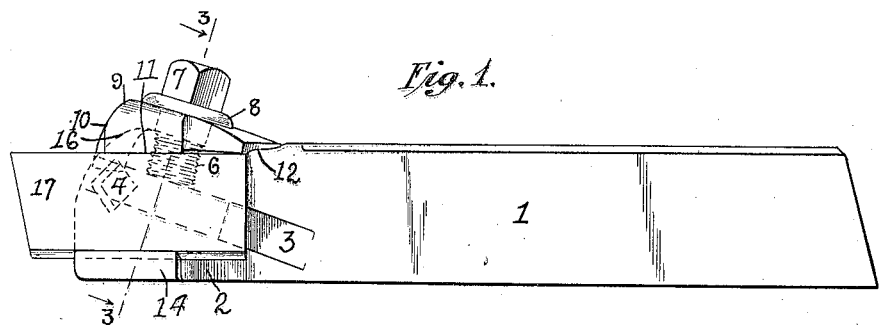
Figure 2:
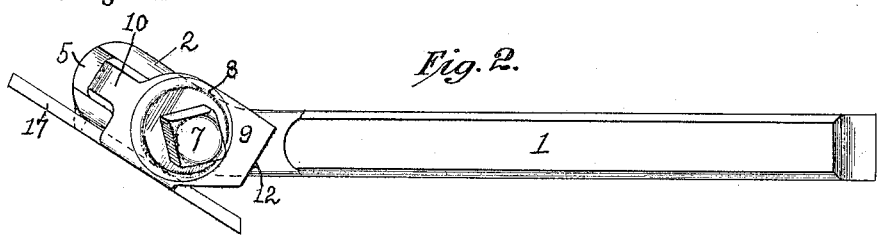
Figure 3:
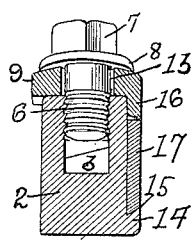
Figure 4:
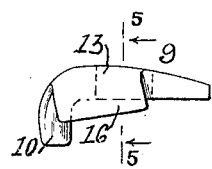
Figure 5:
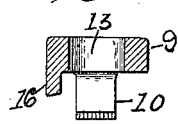
Figure 6:
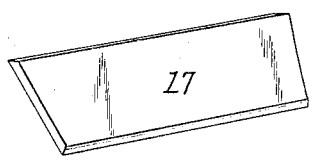

The drawing shows my improved tool holder and Figure 1 is a side view with a parting tool therein; Fig. 2 a top view; Fig. 3 a sectional view on the line 3—3 of Fig. 1; Fig. 4 a view of the clamp; Fig. 5 a sectional view on the line 5—5 of Fig. 4; and Fig. 6 a view of a parting tool.

The tool may be either straight, right or left handed as is common practice.

The tool holder is composed of a shank 1 provided at one end with an integral head 2. A downwardly inclined hole for a cutter 3 extends from the end of the head to the side of the shank to hold an ordinary lathe tool which projects from the end surface of the head at an upward inclination. This hole for a cutter 3 is intersected by another hole for a cutter 4 which extends through the head from side to side, the bottoms of the two holes coinciding so that a tool, such as a boring tool, can be placed in the transverse hole 4. The hole 3 terminates in a recess 5 in the upper part of the end surface of the head so that the recess communicates both with the longitudinal recess 3 and the transverse recess 4. A screw threaded hole 6 extends downward from the top edge of the head 2 to the top of the hole 4 and in this threaded hole is mounted a set screw 7 for clamping the parts and is provided with a bearing shoulder 8.

A clamp 9 is provided with a downwardly projecting jaw 10 which jaw can pass into the recess 5 and into the transverse hole for a cutter 4 and is in front of the partition 11 formed between the bottom of the recess 5 and the threaded hole 6. The under side of the body of the clamp is finished off straight and at the lower end of a straight portion of the head a shoulder 12 is formed so that when the clamp is placed on top of the head with its lug in the recess 5 the inner end edge of the clamp rests against the shoulder 12 which forms an abutment. The clamp is raised from the top of the head except at its inner end by the jaw 10 engaging the tool and the pressure of the jaw on the tool is produced by the shoulder 8 on the screw 7. The clamp 9 has a smooth hole 13 extending from top to bottom of sufficient size for the screw 7 to pass freely through it.

For the purpose of holding a parting tool the side face of the head is provided with a rib 14 at its lower edge having its upper face 15 parallel with the bottom of the head and preferably under-cut as shown. The side of the clamp 9 has a depending skirt 16 which overhangs the side of the head above the rib 14 and has its lower edge substantially parallel with the upper edge of the rib and is also preferably undercut as shown. To afford the greatest bearing and gripping surface the rib 14 should be carried well forward on the head and be as long as possible. The skirt on the clamp should also be carried well forward and separated from the jaw 10 by a recess which straddles the side wall of the recess 5.

A parting tool 17 is placed against the side wall of the head with its lower edge resting on the rib 14 and the clamp is forced down by the screw so that the skirt 16 bears against the top edge of the parting tool and forces it against the top of the rib thereby locking it firmly to the side of the tool holder. The under cut faces of the rib and skirt tend to force the parting tool into more intimate contact with the side of the head and to hold it more securely in place.

My tool holder thus improved is self contained and will hold turning, boring or parting tools without change and without the use of additional loose pieces or attachments.

I claim:—

1. A tool holder consisting of a shank terminating in a head, a projecting rib on the lower side of the head, said head having a hole for a cutter extending lengthwise therethrough and another hole for a cutter extending transversely therethrough, which holes intersect and a clamp having a skirt depending from its side and facing the rib for clamping a parting tool said cutter being capable of being placed in the longitudinal hole or the transverse hole substantially as described.

2. A tool holder consisting of a shank terminating in a head, a projecting rib on the lower side of the head, said head having a hole for a cutter extending lengthwise therethrough and another hole for a cutter extending transversely therethrough, which holes intersect, in combination with a clamp having a jaw extending into the holes at their intersection and a skirt depending from its side and facing the rib and means for holding said clamp in place.

3. A tool holder consisting of a shank terminating in a head, a projecting rib on the lower side of the head, said head having a hole for a cutter extending lengthwise therethrough and another hole for a cutter extending transversely therethrough, which holes intersect, in combination with a clamp resting on the top of the head, which clamp has an aperture and a downwardly extending jaw and a skirt depending from its side and facing the rib and a screw passed through the clamp into the top of the head portion of the tool holder substantially as described.

4. In a tool holder, the combination with a shank having a head at one end, a projecting rib on the lower side of the head, the top of the head being inclined rearwardly and downwardly to form a shoulder in the top edge of the shank, said head having lengthwise, intersecting transverse and lengthwise holes for cutters, a clamp resting with one end against the shoulder and having a downwardly projecting lug at the opposite end and a skirt depending from its side and facing the rib and a screw passing through the clamp into the top edge of the head substantially as described.

5. In a tool holder the combination with a shank terminating in a head, a projecting rib on the lower side of the head, the top of the head being inclined downwardly and rearwardly to form a shoulder, the head having lengthwise and transverse intersecting holes for cutters, a recess formed in the end of the head and communicating with both holes a clamp fitting on the top of the head and resting with one end against the shoulder and having a downwardly inclined jaw at the opposite end and a skirt depending from its side and facing the rib, and a screw passed through the clamp into a threaded aperture in the top of the shank substantially as set forth.

6. In a tool holder, the combination with a shank terminating in a head, a projecting rib in the lower side of the head, said head having longitudinal and transverse intersecting holes for cutters, the longitudinal hole extending from the front end of the head to one of the surfaces of the shank and terminating in said surface, of a clamp having a jaw extending into the holes at their intersection and a skirt depending from its side and facing the rib and means for holding the clamp in place substantially as described.

7. A tool holder consisting of a shank terminating in a head and having longitudinal and transverse intersecting holes for cutters therethrough, a clamp for clamping a tool placed in either hole, a screw for holding the clamp, a projecting rib in the lower side of the head forming a shoulder for receiving and supporting the bottom edge of a tool said clamp being provided with a skirt extending downwardly over the side of the head and adapted to engage the top edge of the tool substantially as described.

In testimony whereof I have affixed my signature.

GEORGE W. HENRY.

Copies of this patent may be obtained for five cents each, by addressing the "Commissioner of Patents, Washington, D. C."